INVENTOR.
FRANK HODGSON
BY
Dunlap and Jamey
ATTORNEYS

THERMOELECTRIC GENERATOR
Filed June 4, 1965 2 Sheets-Sheet 2
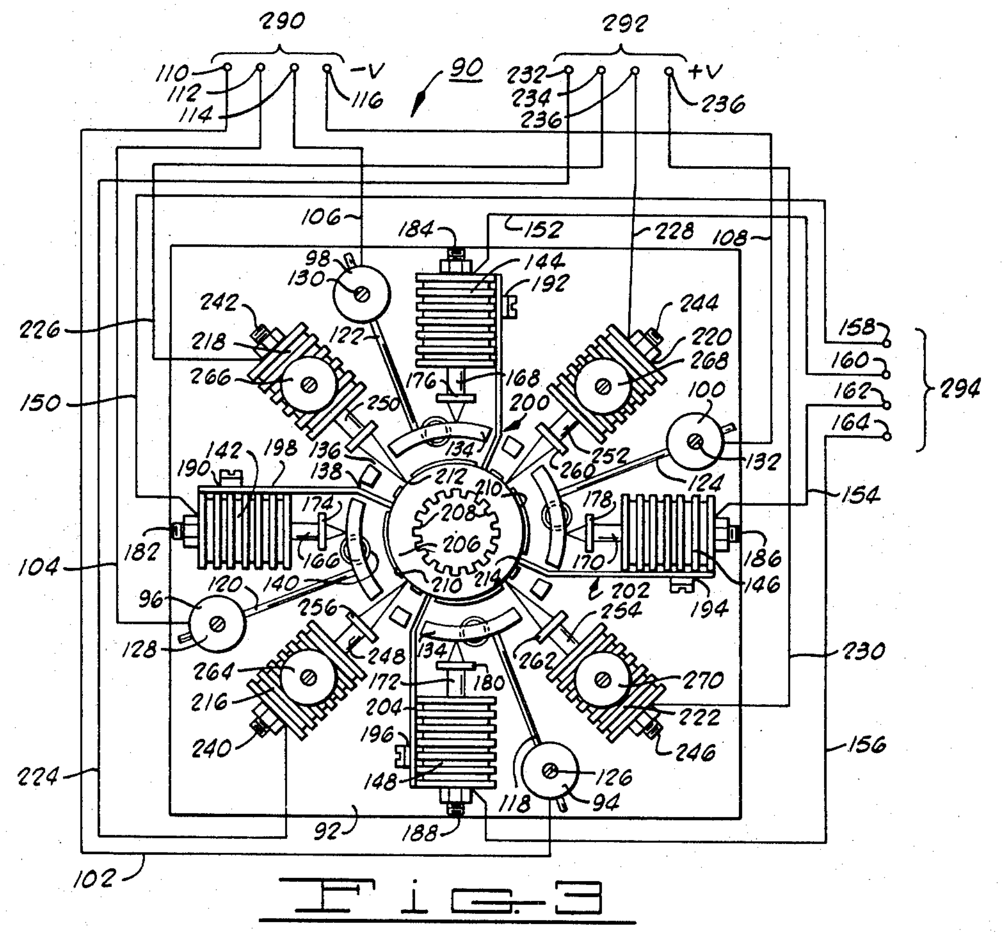
FIG. 3
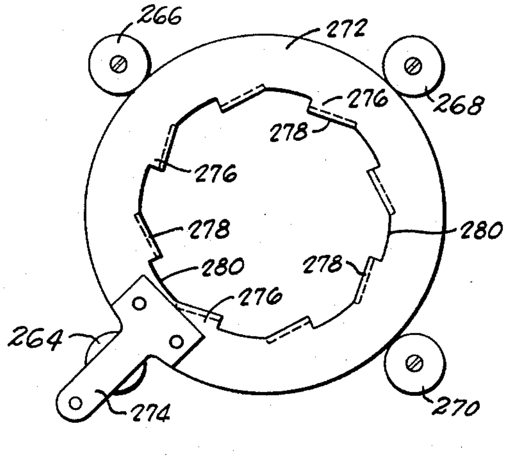
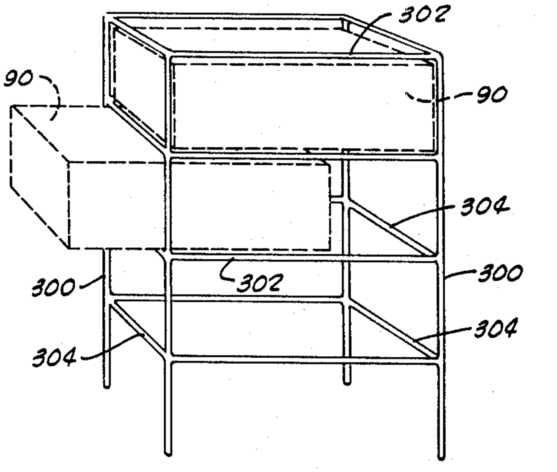
FIG. 5
FIG. 4
INVENTOR.
FRANK HODGSON
BY
Dunlap and Laney
ATTORNEYS United States Patent Office 3,540,940
Patented Nov. 17, 1970

3,540,940
THERMOELECTRIC GENERATOR
Frank Hodgson, P.O. Box 401,
Crested Butte, Colo. 81224
Filed June 4, 1965, Ser. No. 461,390
Int. Cl. H01v *1/22, 1/32*
U.S. Cl. 136—208 4 Claims

ABSTRACT OF THE DISCLOSURE

Apparatus for direct conversion of thermal energy into electrical energy which consists of a copper heat collector supported by a conductive metal rod in position to receive thermal energy from an external source, and one or more contacting elements which are brought into contact with the heat collector through an oxide coating. An electrical energy output is realized across the conductive support rod and respective ones of the contacting elements.

This invention relates generally, as indicated, to a thermoelectric generator; and more particularly, but not by way of limitation, to a thermoelectric generator enabling direct conversion of thermal energy into electrical energy.

It has been discovered that when certain metals are heated to a very high temperature there is a much increased electron activity which can be employed as a work force to energize electrical elements or equipment. This is enabled by establishing a potential gradient across a suitable heated metal so that directional current flow can take place. While the usable voltage and current from a single such assembly is of relatively small value, a series or parallel configuration of multiple units can be employed to provide a power source for innumerable electrical and electronic devices.

The present invention contemplates a thermoelectric generator which utilizes a heat collector as a central element, and which employs particular contactors for source connections to the heat collector element. In a more limited aspect, the present invention provides a metallic heat collector which is supported by a conductive metal rod which makes up one terminal of the voltage source and the other contactor is brought into contacting relationship with the heat collector through an oxide coating. An output taken across the contacting elements can then be utilized to energize a suitable electrical load.

It is an object of the present invention to provide a device for deriving electrical energy directly from heat energy.

It is another object of the present invention to provide a thermoelectric generator which is comprised of the more commonly available materials.

It is still another object of the invention to provide an electrical energy generator which can be adapted for use with any available heat source.

It is still further an object of the present invention to provide a compact, elementary electrical generator which can be easily employed in multiples to derive a desired amount of current and/or voltage at the source output.

Finally, it is an object of the present invention to provide a device for the direct conversion of radiant heat energy to electrical energy at a comparatively high voltage and efficiency.

Other objects and advantages of the invention will be evident from the following detailed description when read in conjunction with the accompanying drawings which illustrate the invention.

In the drawings:

FIG. 3 is a partially diagrammatic top view of a preferred form of thermoelectric generator unit;

FIG. 4 is a top view of a control cam which is utilized in the FIG. 3 embodiment; and FIG. 5 shows an example of a stacking rack which could be employed for enabling the utilization of multiple thermoelectric generator units as shown in FIG. 3.

Figure 1:
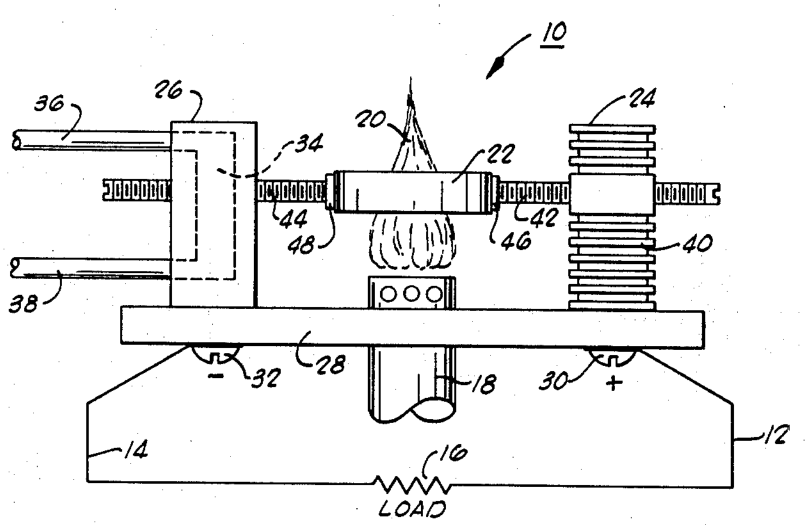
FIG. 1 is a partially diagrammatic side view of an elementary form of converter.

Referring now to the drawings, the detailed description proceeds with reference to FIG. 1. This illustration shows an elementary electric generator 10 connected through a pair of leads 12 and 14 to energize a suitable load 16.

The generator 10 is energized by a suitable heat source, here shown as a burner 18 which emits a flame 20. The flame 20 is directed through a ring-shaped heat collector 22 which is to be heated to a very high temperature, thereby bringing about very greatly increased electron agitation. It should be understood that the collector 22 may be of any desired shape, depending upon the type of heat source and the amount of coupling desired, and heat collector 22 may be formed of any of several different metals; however, copper or high-copper bronze have proven to give the best results.

A pair of terminal blocks 24 and 26 are mounted on a suitable insulating base 28, such as an asbestos plate, and each of these terminal blocks 24 and 26 are in electrical communication through the mounting screws 30 and 32 to the respective leads 12 and 14. The terminal blocks 24 and 26 actually depict two different types which have been found suitable, that is, each utilizes a different type of cooling function. The terminal block 26 is a type which is made of conductive metal and includes a hollowed out portion 34 in communication with the coolant circulation lines 36 and 38. This type of cooling allows greater range and control, however, it may be more sophisticated than is really necessary in many uses. Therefore, the type of terminal block as shown for terminal block 24 has proven to be efficient and convenient for most usage. Terminal block 24 consists of a conductive, metallic block which has a series of milled out portions 40 which serve to increase the heat radiating area of its surface by a great amount.

In any event, the terminal blocks 24 and 26 are each threaded to receive suitable contacting screws 42 and 44 therethrough. The contacting screws 42 and 44 may be of any suitable conducting metal, e.g., brass, and the terminal blocks 24 and 26 have given good performance when formed of brass. The contacting screw 42 is brought into contact with the heat collector 22 through a thin layer of copper oxide 46 and the tension and positioning can be controlled by manipulation of the screw 42. The copper oxide 46 may be deposited by burning the heat collector 22 for a period prior to applying the contact 42. The contact 44, also movable by its screw adjustment, is brought into contact with the element 22 through a film of iron oxide 48.

In the operation of the elementary generator 10, the contacting screw 42 is backed off and the flame 20 is applied to the heat collector 22 for a short period which is sufficient to build up a film of copper oxide on the heat collector 22. The clamping screw or contactor 42 is then screwed into contacting relationship with the heat collector 22 and the flame 20 is continued in its application. When the heat collector 22 reaches a red heat, it has been found that a voltage of about .15 volt is present across the load 16 between the output leads 12 and 14. It was further found that when both terminals 24 and 26 were cooled the terminal voltage reached .25 volt across the load 16. This resulted from the discovery that when the copper heat collecting element 22 is operating at a red heat, the terminal blocks 24 and 26 should be maintained at a relatively cool temperature. In particular, the terminal block 24, which is coupled to the copper oxide connection 46 through contacting screw 42, must not vary much above or below 190° F. This relationship is not difficult to obtain with air cooling of the terminal blocks as shown with respect to terminal block 24.

Although it is the intention not to be limited to any particular theory of operation, it is believed that when an electrically conductive material is sufficiently heated, a greater increased electron activity will enable the conducting away of free electrons in a quantity which can be utilized for performing electrical energization of load devices. By providing a complete circuit through and including the hot conductive material, suitable support and contacting elements, and the load, a sufficient potential gradient can be set up whereby the thermally agitated electrons are given direction as current flow. The amount of current flow then becomes dependent upon the physical characteristics of the materials employed for the various elements. Thus, when a material exhibiting the negative thermoelectric power coefficient is employed to support the metallic heat collector, having a more positive thermoelectric coefficient, a rectifier or diode type of contactor, such as the copper oxide-bronze point, can deliver sizeable current flow from the heated material through a load and return circuit.

Figure 2:
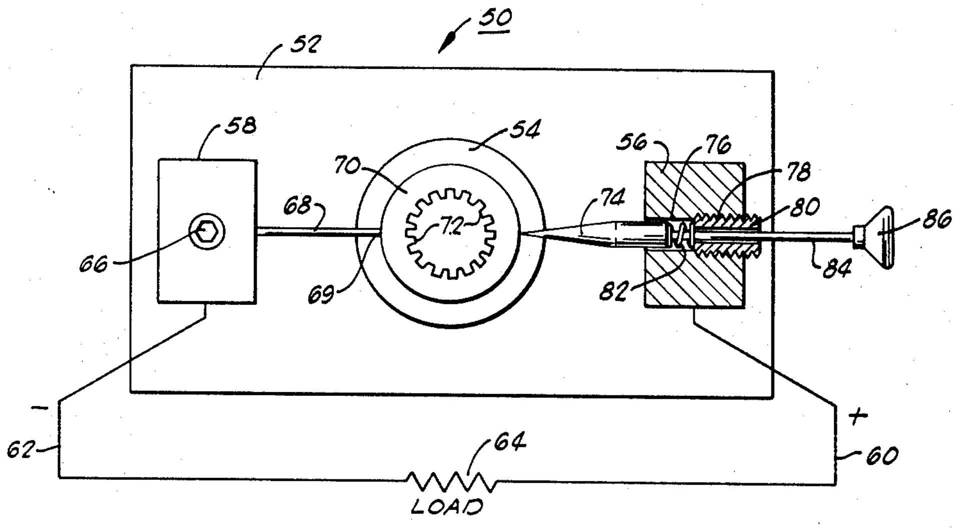
FIG. 2 is a partially diagrammatic top view of an elementary form of thermoelectric generator which embodies alternative forms of contacting elements.

FIG. 2 shows another form of elementary thermoelectric generator 50 which utilizes some advantageous features which enable a greater voltage and current output. The thermoelectric generator 50 is made up of an insulative base plate 52 having a hole 54 cut therein for entry of the heat source. A pair of terminal blocks 56 and 58, which may be the air cooled variety, are mounted on the insulative base plate 52 with terminal connections suitably provided on leads 60 and 62 to a load 64. The terminal block 58 is threaded to have a set screw 66 which is employed to clamp a rod or wire 68 which is affixed to a copper heat collector 70. The heat collector 70, as here employed, is a ring shaped, copper collecting element and is formed to have a plurality of ribs or vanes 72 in the interior thereof in order to increase the heat absorption capabilities. The copper heat collector 70 is welded at 69 to the supporting and conducting wire 68. The wire 68 is preferably formed from the metal constantan and should be heavy enough for support, but as small in cross section as low electrical resistance will permit, in order to keep heat loss from conduction and radiation to a minimum.

The terminal block 56, which may be an air cooled type, employs a spring-loaded contact 74 to allow greater ease of the manual contacting function. The terminal block 56 has a bore 76 with a threaded portion 78 extending therethrough. A threaded sleeve 80 is then inserted to enclose a compression spring 82 so that it continually biases the contact point 74 toward the surface of the heat collector 70. The contact 74 is preferably formed from hard brass or bronze and has an extension 84 leading through the spring mechanism, and the external end is fitted with a suitable knob or other manipulation means 86.

The operation of the thermoelectric generator 50 is similar to that of generator 10 in FIG. 1 except that a greater voltage and current yield is derived. The heat source is introduced into the heat collector 70 to bring it to a red heat. At this time, the knob 86 is held withdrawn to maintain the bronze contactor 74 out of contact with the heat collector 70 so that a film of copper oxide can be built up on the surface of the heat collector 70. This oxide build up takes place within a short interval and, actually, before any visable evidence shows, the knob 86 can be released to place the contactor 74 on the oxide coated collector 70. A potential difference will then exist to provide current flow through constantan rod 68 and the welded junction 69 to the heat collector 70 and through the copper oxide layer, being of positive type material, to the bronze contactor 74 and the terminal 56 so that the generated potential will be placed across the load 64.

The FIG. 3 illustration shows a preferred form of thermoelectric generator which, in effect, employs a multiple of the previously described elementary units. The thermoelectric generator 90 is assembled complete upon the insulative base plate 92 which has a hole in the center (not shown) for entry of the heat source. The terminal blocks 94, 96, 98 and 100 are each connected by the respective electrical leads 102, 104, 106 and 108 to the terminals 110, 112, 114 and 116. The terminal blocks 94–100 are shown in cylindrical form preferably having cooling vanes milled in the horizontal plane and each having a hole in which to receive the respective constantan leads 118, 120, 122 and 124. The constantan leads 118–124 can then be secured in the respective terminal posts 94, 100 by the set screws 126, 128, 130 and 132.

Each of the constantan rods or wires 118–124 is welded or otherwise permanently secured to form a junction with a heat reflector 134. The heat reflector 134 is also a cylindrical, copper element having a number of passage holes 136 and 138 therethrough. The holes 136 and 138 are similar and the same size, however, the variation in designation is for purposes of function as will be described. The copper heat reflector 134 is preferably jacketed with silver plate on the outer periphery to increase the overall efficiency of the device. In the event that the silver plated, copper heat reflector 134 is employed, it will be necessary to scrape the plating away at each small location where it is desirable for copper oxide to form such that a contact point can be received thereon (to be described). Also, porcelain foot members 140 are prefearbly placed in a suitable movable seating between the base plate 92 and the heat reflector 134 so that they can support the heat reflector 134 and still allow the expected expansion and contraction of the elements during the operation.

Aa second set of intermediate terminal blocks 142, 144, 146 and 148 are connected through the respective wires 150, 152, 154 and 156 to the intermediate voltage terminals 158, 160, 162 and 164. Each of these intermediate terminal blocks 142–148 is formed to carry the respective bronze contacting points 166, 168, 170 and 172 which are each shaped to have a circular collar 174, 176, 178 and 180 thereon. These circular collars 174–180 aid in cooling by providing additional heat radiation area and they also function in connection with a contact positioning device as will be described later. Each of the contacts 166–172 is allowed to contact the heat reflector 134 and, in the event that the silver plated type of reflector 134 is employed, a small area of the copper should be exposed at each of these contacting points.

The contacts 166 through 172 are each held in longitudinally movable support within the terminal blocks 142–148 in the same manner as set forth for contact 74 in FIG. 2. That is, they are biased by a spring load within the terminal blocks 142–148 and the respective set screws 182, 184, 186 and 188 can be used for adjusting the bias on the individual contact elements. A connection is then provided from each of terminal blocks 142–148 through suitable screw clamps 190, 192, 194 and 196 to four more constantan wires 198, 200, 202 and 204. The constantan wires or rods 198–204 are each lead through the holes 138 in the heat reflector 134 where they are then joined or welded to a heat collector 206.

The heat collector 206 may be similar in form to that of FIG. 2 such that it includes the radial fin members 208 which serve to increase the amount of heat absorption. Still further efficiency and increased operational life of the heat collector 206 is enabled by the encasement within a jacket 210. This jacketing can be effected through the use of suitable metals such as steel, silver, etc. so long as the collector contact areas 212 and junction areas 214 are left exposed.

A set of contact terminal blocks 216, 218, 220 and 222 are connected by the respective leads 224, 226, 228 and 230 to a series of positive output terminals 232, 234, 236 and 238. The contact terminals 216–222 are also spring loaded similar to the terminal 56 of FIG. 2. The set screws 240, 242, 244 and 246 serve to bias the spring loading of each of the respective contactor elements 248, 250, 252 and 254 into contact with the oxided, exposed surface at areas 212 of the heat collector 206. Each of the contacting elements 248–254 is also formed to have a heat radiating collar 256, 258, 260 and 262 which also serves as a bearing surface for positioning control as will be described.

Each of the contact terminal blocks 216–222 is fitted to have a rotatable pulley wheel 264, 266, 268 and 270 mounted on its upper surface. The pulley members 264–270 are each formed to have a groove (not shown) on its vertical edge such that it can receive and movably hold a control cam 272. FIG. 4 shows a top view of the control cam 272 having a suitable manipulating extension 274. The area of the control cam 272 around its inner perimeter has a series of inwardly extending triangular areas 276 each of which has a downwardly bent portion 278 extending below to form a bearing surface for effecting radial movement of each of the contact members 166–172 and 248–254. There are eight of the angular extensions 278 all of the same angle and slope with respect to the inner perimeter 280 of control cam 272. Thus, the control cam 272 can be inserted down in the thermoelectric unit 90 such that its edge is held rotatably within the four pulleys 264–270 and each of the downwardly flanged angular portions 278 will come into guiding contact with the contact radiation members 256, 174, 258, 176, 260, 178, 262 and 180. In this manner, the handle 274 of the control cam 272 can be moved rotationally to bring all contacting elements out of contact with the heat collector 206 and heat reflector 134 during the oxidization period and then the handle 274 can be rotated in reverse to allow proper contact of the elements.

In operation, the thermoelectric unit 90 would first be placed in a proper position for receiving its heat application. This, of course, could be from a hot pipe, direct flame or any available source. In this initial or starting condition, the control cam 272 would be manipulated so that all of the contacts 248–254 and the intermediate contacts 166–172 would be withdrawn from contact with the respective heat collector 206 and the heat reflector 134. When in this phase, the heat is applied to the heat collector 206 and heat reflector 134 so that it forms a film of copper oxide at the points of contact on each member. In the event that a silver plated heat reflector 134 is employed, these contact points should be scraped or drilled out to expose a copper area. With the heat collector 206, the holes 212 in the outer jacket 210 provide a suitable exposed copper area. It is also contemplated that in some applications it may be desirable to insert tubular ceramic insulation sleeves within the holes 136 and 138 through the heat reflector 134.

After a short period during which oxidation takes place and a film of copper oxide has been formed, the control cam 272 is manipulated to release all of the spring-biased contactors 248–254 and 166–172 such that they are urged into contact with their respective copper oxided areas. The unit is then in its energized condition such that it can produce usable output power. An output EMF will be delivered between the negative terminals 290 and the positive terminals 292 which can then be delivered for energization of a suitable load. The amount of current available to the load can be controlled by the number of individual thermoelectric units which are paralleled to provide the output. That is, the negative output terminal 110 and the positive output terminal 232 would provide the current output generated by a single or individual thermoelectric unit consisting of the generation elements connected between leads 102 and 224.

Thus, the current through the source follows from the negative terminal 94 through the constantan wire 118 to the heat reflector 134 and then through contactor 172, intermediate terminal 148 and constantan rod 204 to the heat collector 206 which is then contacted by the contact 248 and positive terminal 216 in connection with the positive output lead 224. Any multiple of the individual thermoelectric units may be connected in parallel to supply proportionally greater current by paralleling the terminals 110–116 and terminals 232–238 to supply the source output to the load. The intermediate terminals in group 294 are available to supply an intermediate EMF value as generated across a negative contacting constantan wire, the heat reflector 134 and the intermediate terminal contacts 166 through 172.

FIG. 5 shows a type of rack wherein a multiple of thermoelectric generators 90 could be connected around a common heat source. The rack comprises the upright legs 300 connected by a series of cross members 302 and 304. Each of the individual spaces or tiers would then be of the proper size to receive a thermoelectric generator 90 therein. The generators 90 may be fastened in the rack by any suitable means and in such a manner that the center or heat receiving portions of each generator 90 will line up to enable the most efficient heat transfer from a common heat source. This, of course, might be a flame, heated conduit or pipe, or whatever. With this type of stacking arrangement, each individual generator 90 acts as an individual cell and the outputs may be connected in series or parallel depending upon the voltage and/or current requirements of the particular situation.

The contact points have largely been referred to as being made of bronze, however, it should be understood that other materials such as iron, tungsten and platinum have been used to good advantage. Carbon contacts are also desirable in certain applications where their rapid oxidization characteristic is not detrimental. The particular shape and configuration of elements in the thermoelectric generator 90 may be varied greatly to conform to the application of any particular heat source. That is, the heat collector and/or a heat reflector will be shaped to enable the most efficient heat transfer from a hot body. Metal bars have been used in a coal fire, saucer shapes have been used to absorb solar energy where the heat is concentrated by a lens or reflector, a tube shaped collector may be used to surround high temperature pipes, and many other configurations are possible since the primary consideration is that of heat absorption and the shape and material of components can be easily varied to conform to whatever the requirements.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. A thermoelectric generator comprising:

a copper heat collector means for receiving heat directly;

a plurality of first support conductors affixed to said heat collector;

a metallic heat reflector having a plurality of passage holes about the periphery, said reflector positioned to enclose said heat collector in noncontacting relationship;

a plurality of second support conductors affixed to said heat reflector;

first terminals connected to said second support conductors and each providing a negative output terminal;

second terminals connected to said first support conductors and each providing an intermediate terminal;

first adjustable contacts extending from each of said second terminals to contact said heat reflector;

a plurality of second adjustable contacts extending through said passage holes for connection to the surface of said heat collector; and third terminals electrically connected to and supporting each of said second contacts to provide positive output terminals.

2. A thermoelectric generator as set forth in claim 1 wherein said first and second terminals each comprise:
metallic bodies each formed to have a plurality of cooling fins to increase the heat radiating area.

3. A thermoelectric generator as set forth in claim 1 wherein said first and second terminals each comprise:
metallic bodies each formed to have a fluid passage therethrough for the circulation of cooling fluid.

4. A thermoelectric generator as set forth in claim 1 which is further characterized to include:
control cam means which can be rotated to withdraw all of said first and second adjustable contacts and rotated in reverse to reposition said first and second adjustable contacts on the respective heat reflector and heat collector.

References Cited

UNITED STATES PATENTS

| | | | |
|---|---|---|---|
| 2,232,961 | 2/1941 | Milnes | 136—211 |
| 3,129,116 | 4/1964 | Corry | 136—208 |
| 3,169,200 | 2/1965 | Huffman | 136—237 X |
| 3,188,240 | 6/1965 | Lee et al. | 136—237 X |
| 3,303,057 | 2/1967 | Winckler et al. | 136—205 |

FOREIGN PATENTS

| | | |
|---|---|---|
| 219,349 | 10/1958 | Australia. |
| 371,523 | 1/1907 | France. |
| 19,794 | 1907 | Great Britain. |

A. B. CURTIS, Primary Examiner

U.S. Cl. X.R.

136—205, 237